(12) United States Patent
Onoe

(10) Patent No.: US 7,743,527 B2
(45) Date of Patent: Jun. 29, 2010

(54) POSITION DETECTOR

(75) Inventor: Ken Onoe, Tokyo (JP)

(73) Assignee: Mori Seiki Co., Ltd., Nara (JP)

( * ) Notice: Subject to any disclaimer, the term of this patent is extended or adjusted under 35 U.S.C. 154(b) by 54 days.

(21) Appl. No.: 12/257,506

(22) Filed: Oct. 24, 2008

(65) Prior Publication Data

US 2009/0106997 A1 Apr. 30, 2009

(30) Foreign Application Priority Data

Oct. 31, 2007 (JP) ............................. 2007-284044

(51) Int. Cl.
*G01B 7/00* (2006.01)
*G01B 11/00* (2006.01)

(52) U.S. Cl. ........................................................ 33/706

(58) Field of Classification Search .................. 33/706, 33/707, 708
See application file for complete search history.

(56) References Cited

U.S. PATENT DOCUMENTS

| 5,551,163 | A | * | 9/1996 | Affa | 33/702 |
| 5,987,768 | A | * | 11/1999 | Freitag et al. | 33/706 |
| 6,105,271 | A | * | 8/2000 | Freitag et al. | 33/706 |
| 6,571,486 | B1 | * | 6/2003 | Tondorf et al. | 33/706 |
| 6,578,283 | B2 | * | 6/2003 | Nishi | 33/706 |
| 7,225,555 | B2 | * | 6/2007 | Kawada et al. | 33/706 |
| 7,389,595 | B2 | * | 6/2008 | Meissner et al. | 33/707 |
| 7,571,552 | B2 | * | 8/2009 | McAdam | 33/706 |
| 2002/0029488 | A1 | * | 3/2002 | Nishi | 33/706 |
| 2002/0129508 | A1 | * | 9/2002 | Blattner et al. | 33/706 |
| 2004/0103551 | A1 | * | 6/2004 | Wahl et al. | 33/707 |
| 2006/0196071 | A1 | * | 9/2006 | Bader et al. | 33/706 |

FOREIGN PATENT DOCUMENTS

JP 3019585 1/2000

* cited by examiner

*Primary Examiner*—Christopher W Fulton
(74) *Attorney, Agent, or Firm*—Sonnenschein Nath & Rosenthal LLP

(57) ABSTRACT

The present invention Provides a position detector includes a scale provided with a recording medium recorded with information for position detection; a slider disposed to face the recording medium of the scale and to relatively travel along an elongate direction of the scale and provided with a detection sensor for detecting the information of the recording medium, a carrier for carrying the slider, and a posture control mechanism disposed between the carrier and the slider to control slider posture relative to the scale. The posture control mechanism is located on a straight line being vertical to a plane provided with the recording medium facing the detection sensor and passing the detection sensor and biases the slider toward the scale in the direction of the straight line for posture control. The slider is provided with a guide restricting section slidably contact with the scale to restrict a biasing force of the posture control mechanism.

4 Claims, 11 Drawing Sheets

POSITION DETECTOR

CROSS REFERENCES TO RELATED APPLICATIONS

The present invention contains subject matter related to Japanese Patent Application JP 2007-284044, filed in the Japan Patent Office on Oct. 31, 2007, the entire contents of which being incorporated herein by reference.

BACKGROUND OF THE INVENTION

1. Field of the Invention

The present invention relates to a position detector such as a digital scale, an encoder, etc. applied to machine tools, industrial machines, precise length measuring machines or the like.

2. Description of the Related Art

A position detector which is a scale, a rotary encoder or the like is applied to machine tools such as milling machines, lathes, NC machine tools and the like, industrial machines, precise length measuring-angle measuring machines or the like. In the past, the position detector includes e.g. a thin plate-like scale member installed on a machine tool main body; a slider attached to a workpiece traveling table of the machine tool at a position opposite to the scale member; and a detection head attached to the slider. In addition, the position detector is used to read calibrations formed on the scale member for position detection and for controlling a processing-amount of the workpiece or the like.

Additionally, such a position detector is such that a carrier is provided on a slider-fixing section supporting the slider so that the slider is supported through the carrier and can be moved by the carrier.

Incidentally, in order to allow the position detector mentioned above to execute position detection with a high degree of accuracy and of resolution, e.g. a magnetic recording pitch (recording wavelength) of the scale members is reduced and a clearance between the detection head and the scale member is reduced. However, in the position detector, mechanical displacement occurs between the carrier and the scale member due to assembly accuracy, component tolerance or the like. This mechanical displacement varies the above-mentioned clearance and the like so that precise position detection cannot be executed, which leads to damage to the detection head in some cases. To solve such a problem, a position detector is proposed that is equipped between a carrier and a slider with an adjustable mechanism for suppressing displacement (see e.g. Japanese patent No. 3019685).

A scale device 100 shown in FIG. 9 is a traditional scale device and includes a carrier 102 supporting a slider 101; and a scale member 104 disposed to face a detection head 103 mounted on the slider 101. The detection head 103 and the scale member 104 are relatively moved and the detection head 103 detects a position signal from the scale member 104 for position detection. In addition, the scale device 100 includes an adjustable mechanism 107, at a position along the relative movement direction, composed of a carrier side coupling member 105 provided on the carrier 102 and a slider side coupling member 106 provided on the slider. This adjustable mechanism 107 suppresses the displacement between the detection head 103 and the scale member 104.

The adjustable mechanism 107 is provided in the scale device 100 so as to extend in the longitudinal direction of the scale device 104, in the relative movement direction. This configuration results from the scale device 100 having dimensional room in the longitudinal direction of the scale member 104. However, the configuration is not efficient in an applying direction of force for posture control with respect to reduction in the clearance between the scale member 104 and the detection head 103 and to retainment of such a reduced clearance.

A scale device 200 is also proposed in which a leaf spring 201 is provided in a plane vertical to a relative movement direction as shown in FIG. 10. Like reference numerals are given to the same functions and configurations of the scale device 200 as those of the scale device 100 and their explanations are omitted. The scale device 200 is such that one end of the leaf spring 201 is secured to a carrier 102 in a plane generally vertical to the longitudinal direction of a scale member 104. In addition, the other end of the leaf spring 201 is brought into contact with a plane opposite to a plane provided thereon with a detection head 103 of the slider 101. Thus, the slider 101 is biased toward the scale member 104.

However, in terms of the structure of the leaf spring, the scale device 200 having the leaf spring 201 is not such that the slider 101 is retained by a biasing force in a direction vertical to the scale member 104. As with the scale device 100 described above, the scale device 200 is inefficient and inaccuracy.

Also there is known a digital gauge which measures length through movement of a spindle. This digital gauge is generally used to measure a shape in a range as narrow as from 10 to 100 mm. In such a digital gauge having a narrow measuring range, the entire device is reduced in size. Thus, it may physically be impossible to maintain such a device-size and mount the adjustable mechanism 107 provided for the scale device 100.

The digital gauge described above needs assembly with a very high degree of mechanical accuracy, which poses a problem with costs.

SUMMARY OF THE INVENTION

In view of the foregoing, it is desirable to provide a position detector that can maintain a clearance between a scale and a detection sensor and reduce an amount of error with the entire device remaining small-sized.

According to an embodiment of the present invention, there is provided a position detector including: a scale provided with a recording medium recorded with information for position detection; a slider disposed to face the recording medium of the scale and to relatively travel along an elongate direction of the scale and provided with a detection sensor for detecting the information of the recording medium; a carrier for carrying the slider; and a posture control mechanism disposed between the carrier and the slider to control a posture of the slider relative to the scale. The posture control mechanism is located on a straight line being vertical to a plane provided with the recording medium facing the detection sensor and passing the detection sensor and biases the slider toward the scale in the direction of the straight line for posture control. The slider is provided with guide restricting means brought into slidable contact with the scale to restrict a biasing force of the posture control mechanism.

According to the embodiment of the present invention, the posture control mechanism is located on a straight line being vertical to a plane provided with the recording medium facing the detection sensor and passing the detection sensor and biases the slider toward the scale in the direction of the straight line for posture control. Thus, the entire mechanism can be maintained in a small size and the posture control can efficiently be exercised. In addition, the clearance between the scale and the detection sensor can be maintained to suppress displacement as represented by linearity, thereby executing position detection with a high degree of accuracy.

DETAILED DESCRIPTION OF THE PREFERRED EMBODIMENT

Figure 1:
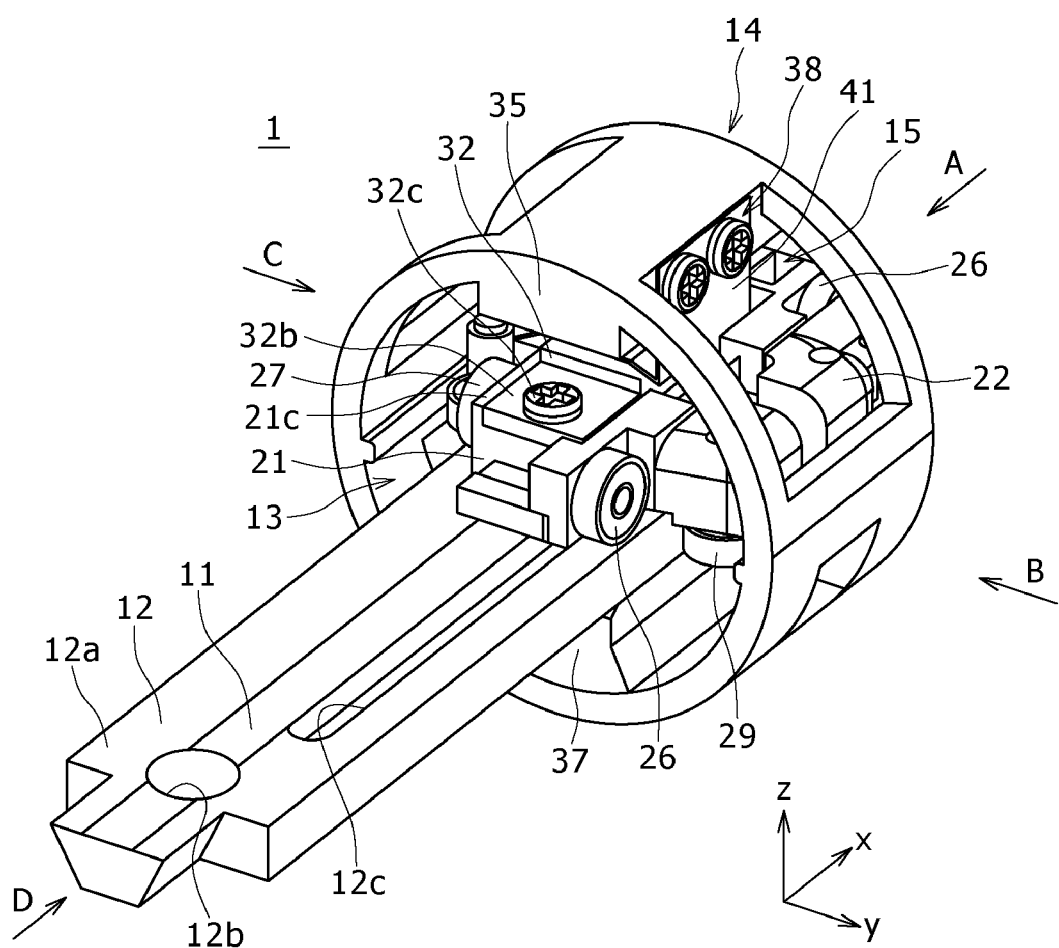
FIG. 1 is an exterior perspective view of a position detector according to an embodiment of the present invention.
Figure 2:
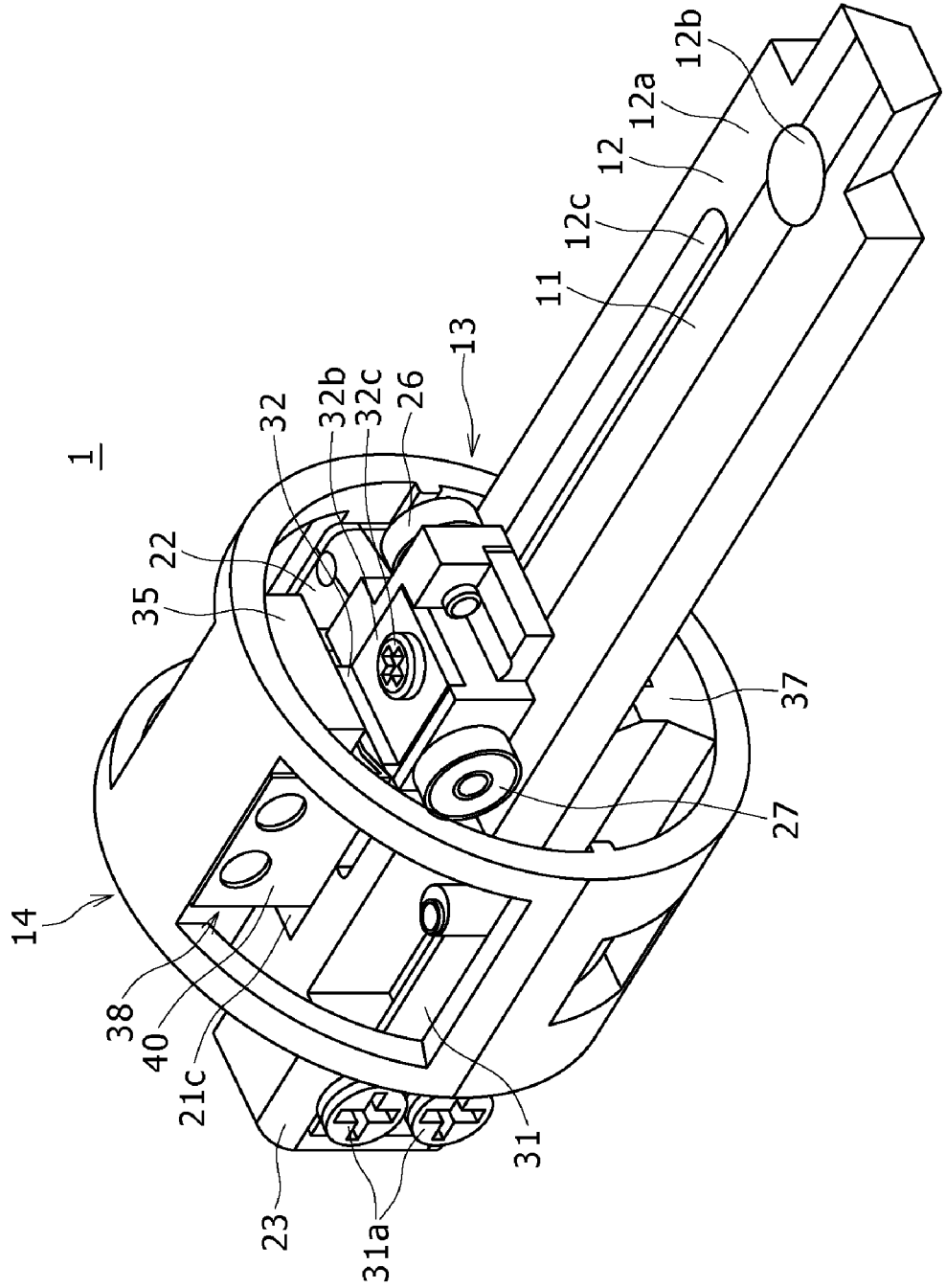
FIG. 2 is an exterior perspective view of the position detector as viewed from an angle different from that of FIG. 1.

Specific embodiment of the present invention will hereinafter be described in detail with reference to drawings. Referring to FIGS. 1 through 7, a position detector 1 according to an embodiment of the present invention is a so-called small-sized digital gauge. The position detector 1 includes a scale 12 provided with a recording medium 11 recorded with information for position detection; a slider 13 moving relative to the scale 12; a carrier 14 for supporting the slider 13; and a posture control mechanism 15 for controlling a posture of the slider 13 relative to the scale 12. The position detector 1 is a spindle type digital gauge in which a spindle not shown and the scale 12 are coupled to each other and the scale 12 works with the elongate-directional movement of the spindle.

It is to be note that in the description the traveling direction of the scale 12 is an x-direction and a direction perpendicular to the x-direction is a y-direction or a z-direction as shown in FIG. 1.

The scale 12 coupled to the spindle is formed like a thin plate and provided with the recording medium 11 on a main surface 12a thereof. The recording medium 11 is recorded with magnetic information and extends in the elongate direction and at a widthwise general center.

The recording medium 11 provided on the scale 12 is inscribed with calibrations capable of detecting position information. Specifically, the recording medium 11 is alternately magnetized with magnetic north and south poles at a constant interval so as to provide a recording wavelength of e.g. 100 μm. Incidentally, the recording medium 11 is not limited to the magnetic type one as described above but may be of an optical type, or of a capacitance type. In such a case, a detection sensor 25 described later is selected from methods capable of detecting the position information.

The scale 12 is provided with a through-hole 12b at one end portion. The scale 12 is connected to the spindle not shown with a bolt (not shown) inserted through the through-hole 12b. The scale 12 is connected to the spindle so that its elongate direction is aligned with the traveling direction of the spindle.

The main surface 12a of the scale 12 is formed with an elongate groove 12c extending parallel to the x-direction which is the elongate direction, i.e., to the elongate direction of the recording medium 11. The groove 12c provided in the scale 12 functions as a runout adapted to avoid the scale 12 coming into contact with a fixing device 28. This fixing device 28 is used to fix a substrate mounted thereon with the detection sensor 25 to the slider 13.

The slider 13 is disposed to face the main surface 12a of the scale 12 and moved relative to the scale 12. Referring to FIGS. 3A through 5, the slider 13 includes a main body portion 21, bearing-attachment brackets 22, 23, and a slider side coupling member 24 of the posture control mechanism 15. The main body portion 21 is formed in a general rectangular parallelepiped and located at a position facing the recording medium 11 of the scale 11. The brackets 22 and 23 are provided on both lateral surfaces 21a and 21b, respectively, of the main body portion 21 on the y-direction side. The slider side coupling member 24 is mounted on an upper surface 21c of the main body portion 21.

The main body portion 21 of the slider 13 is formed in a parallelepiped having a slightly shorter width than a width of the scale 12 and is provided with the detection sensor 25 at a general center of a lower surface 21d opposed to the recording medium 11. The detection sensor 25 can detect the position information of the recording medium 11. The detection sensor 25 is composed of a magnetoresistive element (the MR element) formed by evaporating on glass or the like e.g. a high-permeability thin film such as permalloy or the like. If the detection sensor 25 detects a signal with a recording wavelength of 100 μm, it is preferred that a clearance between the scale 12 and the recording medium 11 be several tens μm. The detection sensor 25 is not limited to being composed of an MR element as described above but may be a magnetic type sensor such as a hall element or the like.

A pair of z-directionally restrictive bearings 26 and 27 are attached to both the lateral surfaces 21a and 21b, respectively, of the main body portion 21 to restrict the z-directional distance between the recording medium 11 and the main body portion 21. The Z-directionally restrictive bearings 26, 27 are slid on the corresponding portions of the main surface 12a where the recording medium 11 of the scale 12 is not provided. The scale 12 follows the z-directionally restrictive bearings 26, 27 to allow the detection sensor 25 and the recording medium 11 not to approach each other in excess of a predetermined distance.

Figure 3A:
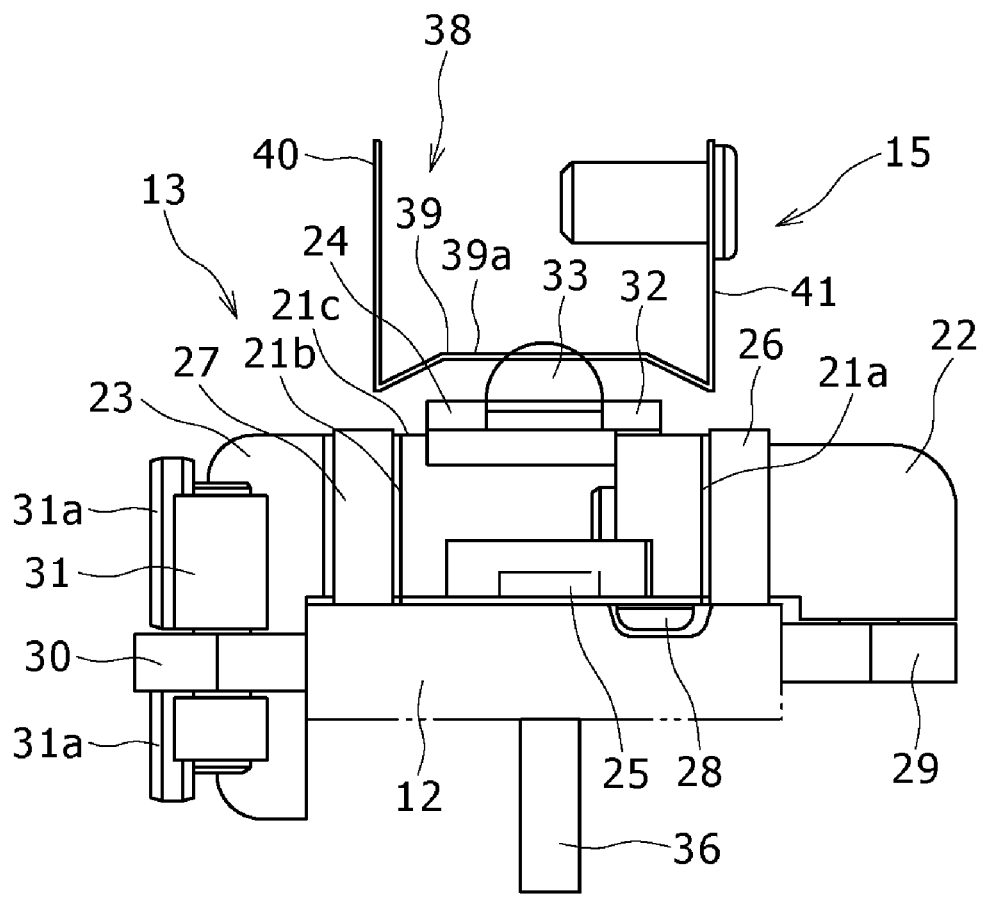
FIG. 3A is an enlarged view of a main portion of the position detector as viewed from the direction of arrow A in FIG. 1.
Figure 3B:
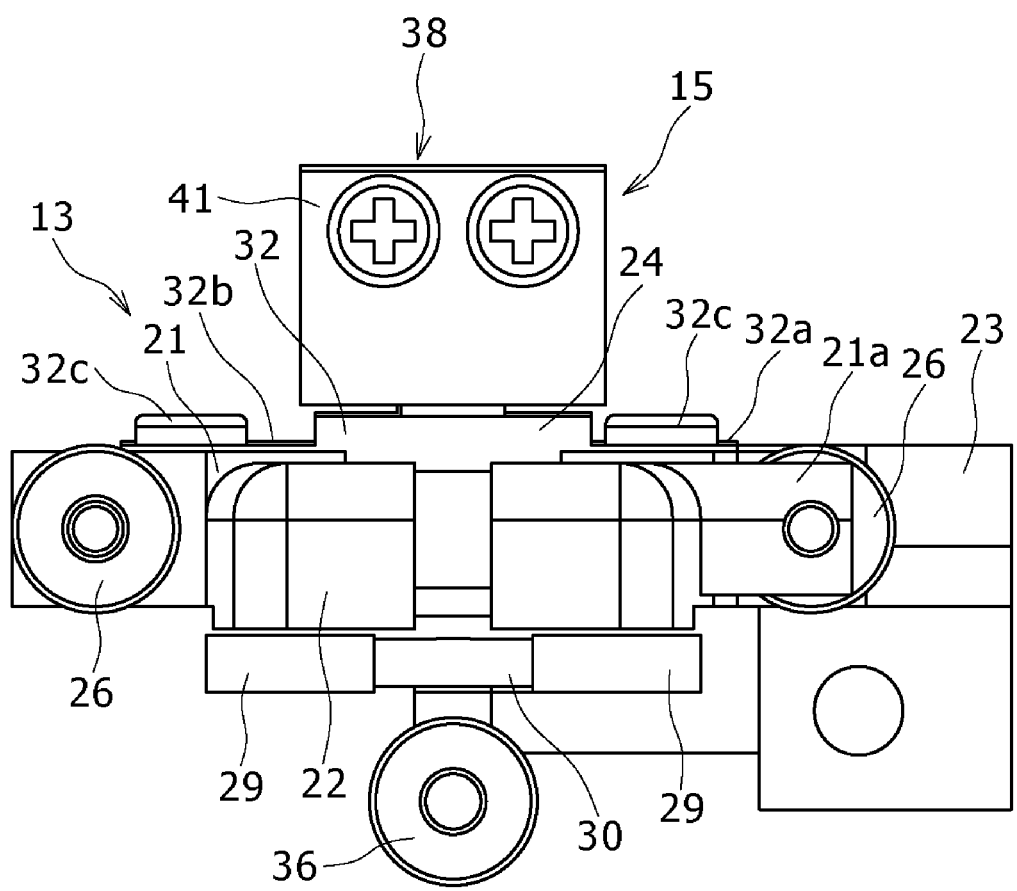
FIG. 3B is an enlarged view of the main portion of the position detector as viewed from the direction of arrow B in FIG. 1.
Figure 3C:
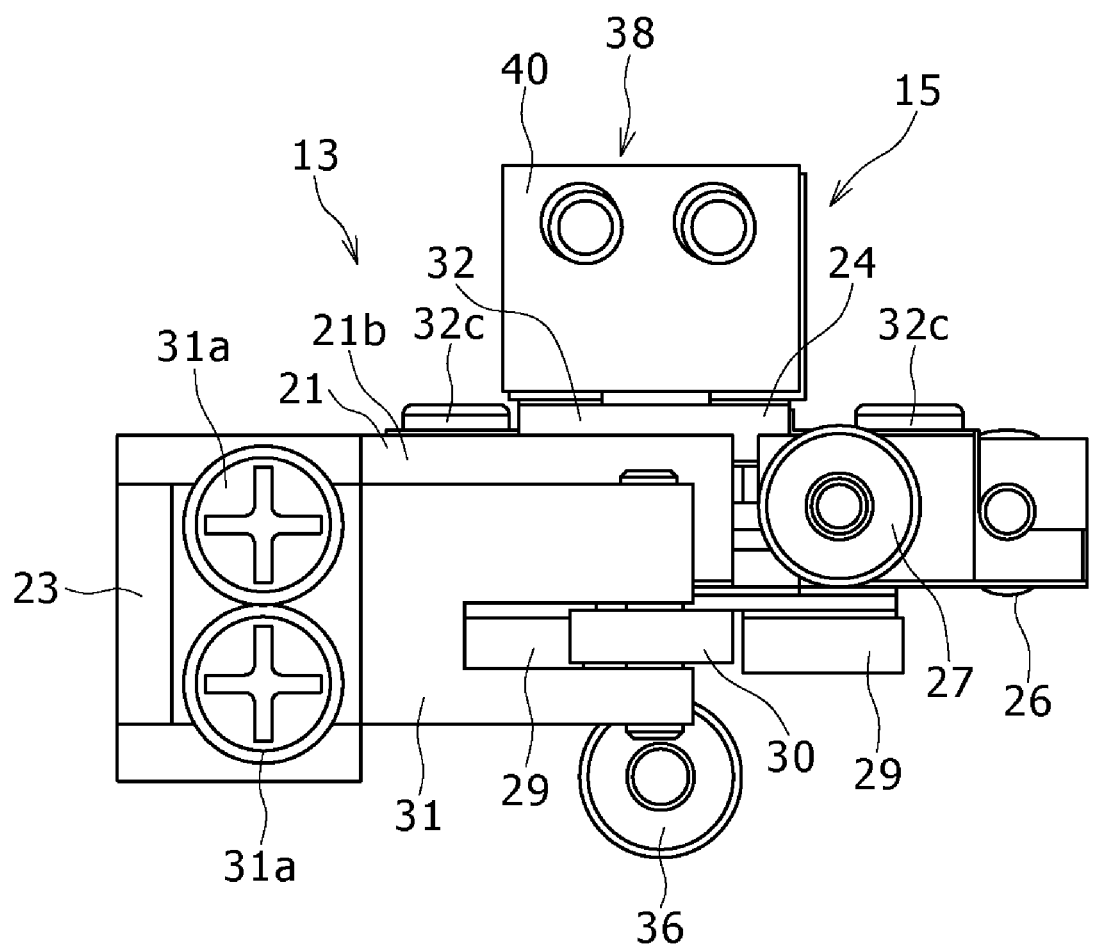
FIG. 3C is an enlarged view of the main portion of the position detector as viewed from the direction of arrow C in FIG. 1.
Figure 4:
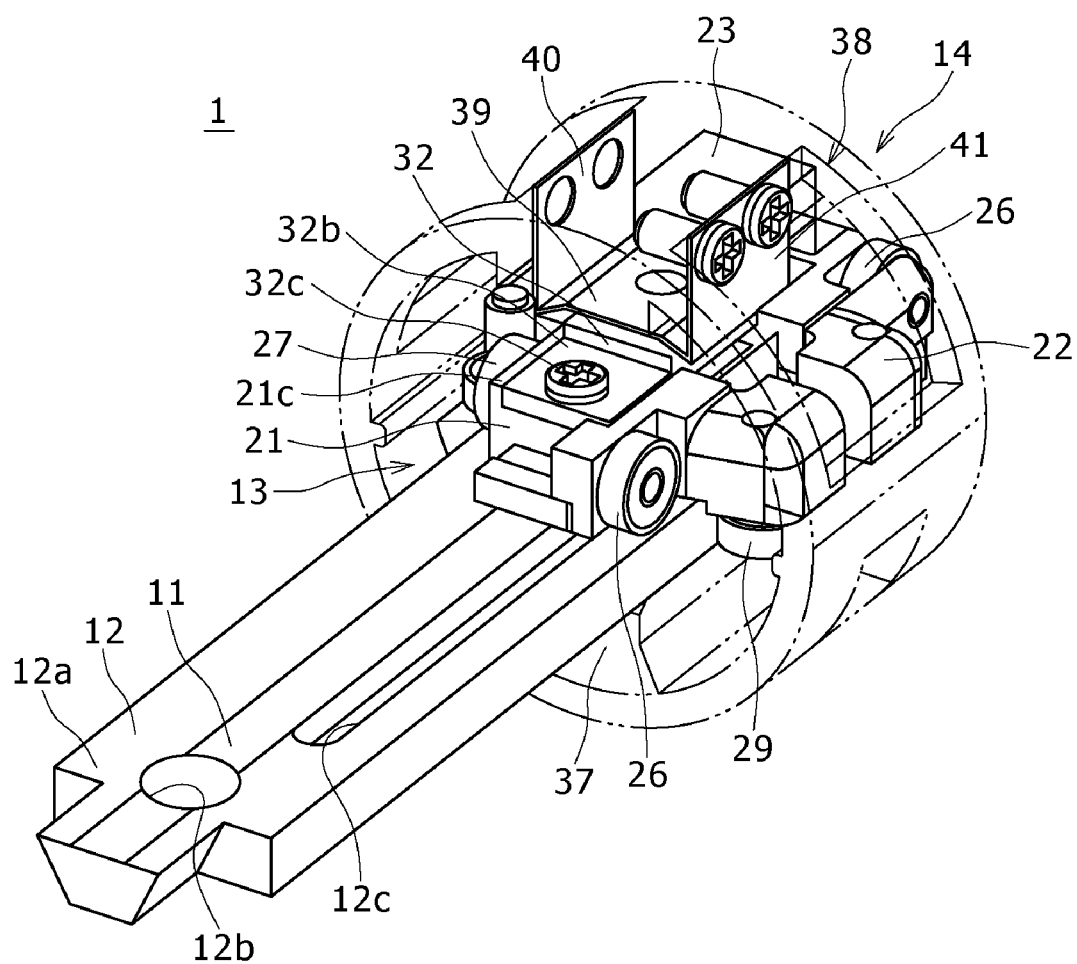
FIG. 4 is a partially broken-away perspective view of the position detector according to the embodiment of the present invention.
Figure 5:
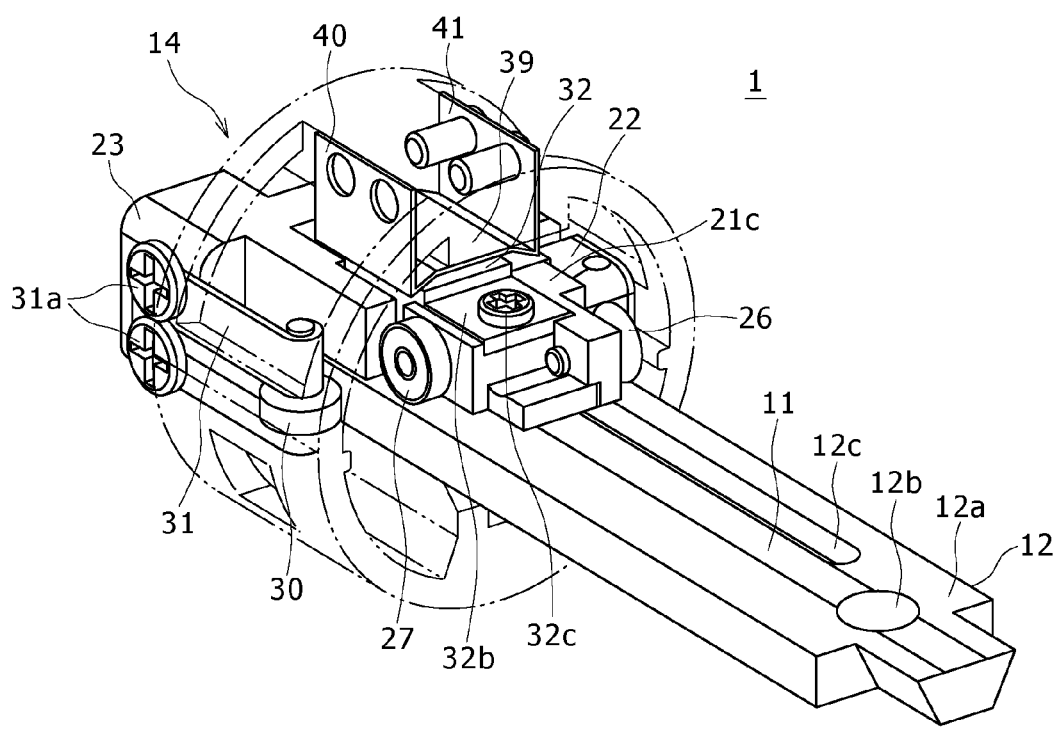
FIG. 5 is a partially broke-away perspective view of the position detector as viewed from an angle different from that of FIG. 1.
Figure 6:
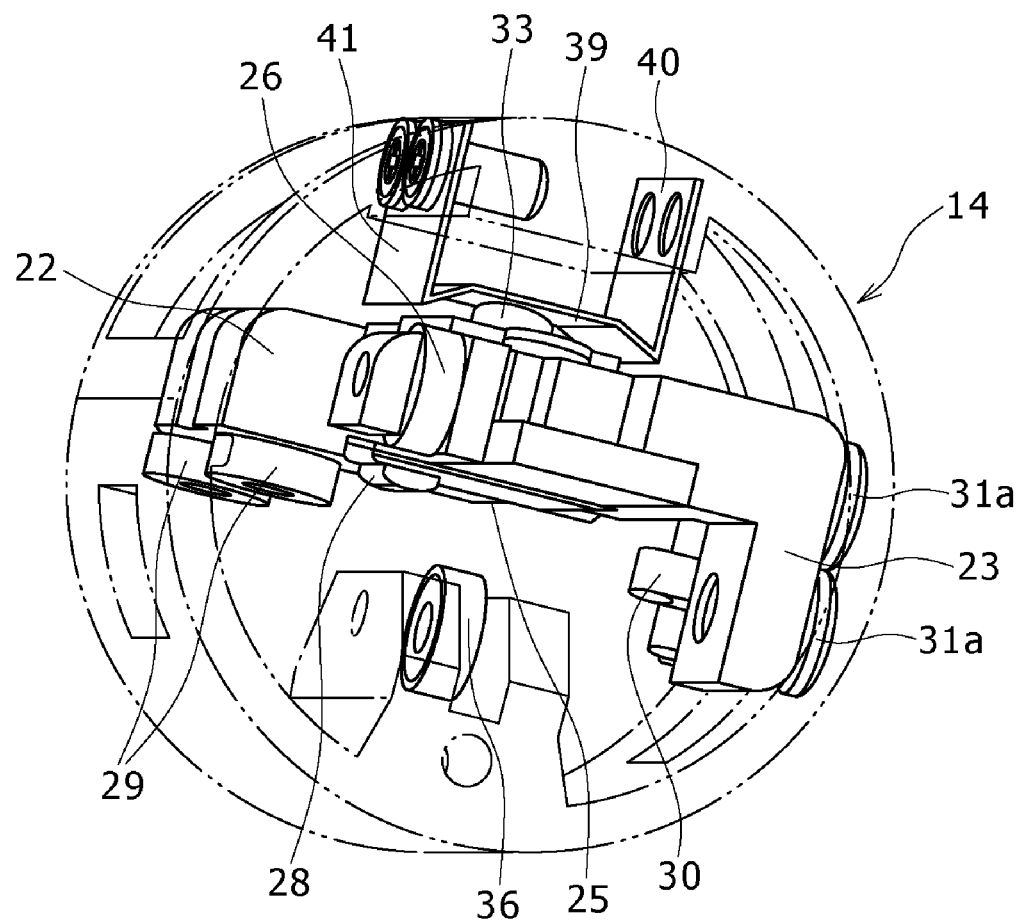
FIG. 6 is an enlarged perspective view of a main portion of a slider and of a posture control mechanism.
Figure 7:
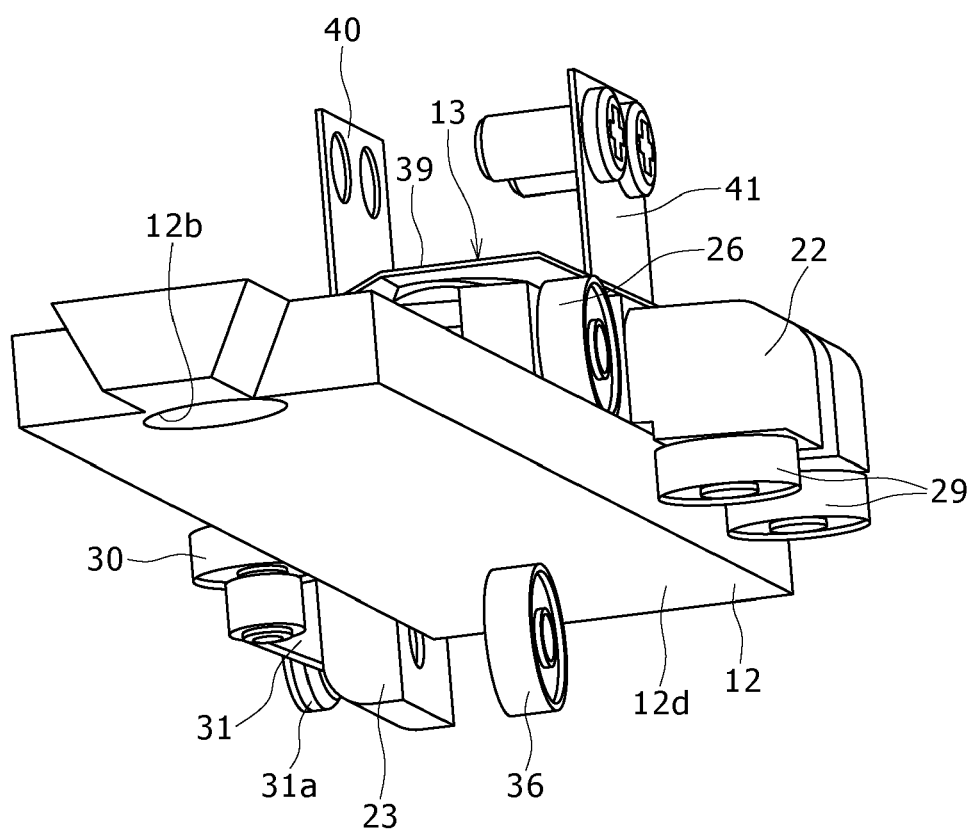
FIG. 7 is a perspective view illustrating a configuration of bearings.

As shown in FIGS. 3A and 6, the fixing device 28 is mounted on the lower surface 21d of the main body portion 21 at a position facing the groove 12c of the scale 12 to fix the substrate mounted thereon with the detection sensor 25 to the slider 13. The fixing device 28 is provided at the position facing the groove 12c of the scale 12 to fix the detection sensor 25 to the slider 13 and to avoid interference with the scale 12 due to the positional relation with the groove 12c.

The bearing-attachment bracket 22 is provided on the side of the lateral surface 21a of the main body portion 21 to project y-directionally from the lateral surface 21a. A pair of y-directionally restrictive bearings 29 are provided at a position facing the lateral surface of the scale 12 to restrict the y-directional displacement of the scale 12. The bearing-attachment bracket 23 is provided on the side of the lateral surface 21b of the main body portion 21 to project –y-directionally from the lateral surface 21b. A y-directionally restrictive bearing 30 is disposed at a position facing a lateral surface of the scale 12 to restrict the y-directional displacement of the scale 12. A leaf spring 31 is attached to the bearing-attachment bracket 23. One end of the leaf spring 31 is secured to the bearing-attachment bracket 23 with screws 31a and the bearing-attachment bracket 23 is provided at the other end of the leaf spring 31 to bias the y-directionally restrictive bearing in the –y-direction. The y-directionally restrictive bearing 30 is disposed at a position equally spaced apart from the pair of y-directionally restrictive bearings 29, 29 and is biased toward the intermediate portion between the pair of y-directionally restrictive bearings 29, 29 to achieve y-directional biasing.

The slider 13 is such that the scale 12 is y-directionally put between the y-directionally restrictive bearings 29 and 30 mounted to the respective bearing-attachment brackets 22 and 23 to restrict the y-directional, i.e., track-directional displacement of the scale 12.

The slider side coupling member 24 provided on the upper surface 21c of the main body portion 21 is a portion of the constituent members of the posture control mechanism 15 described later. The coupling member 24 includes a base portion 32 and a spherical protrusion 33 secured to the general center of the base portion 32. The coupling member 24 is arranged so that the spherical protrusion 33 may z-directionally be aligned with the detection sensor 25.

The base portion 32 of the slider side coupling member 24 is formed plate-like with attachment pieces 32a, 32b at both respective x-directional end portions. In addition, the base portion 32 is secured to the main body portion 21 of the slider 13 with screws 32c, 32c threadedly engaged with respective attachment holes provided in the respective attachment pieces 32a, 32b.

The spherical protrusion 33 of the slider side coupling member 24 is disposed at the general center of the base portion 32 and coupled to a slider side coupling member 24 described later.

The carrier 14 is a member for carrying the slider 13 and includes a cylindrical casing 34 covering the slider 13 and the scale 12; an attachment piece 35 projecting into the inner surface of the casing 34 and used to install a carrier side coupling member 38 of the posture control mechanism 15 and another attachment piece 37 used to install a z-directionally restrictive bearing 36 in slidable contact with the rear surface of the scale 12.

The casing 34 of the carrier 14 has an inner diameter of e.g. about 20 mm, is formed cylindrical and internally connected to the slider 13. The attachment piece 35 of the casing 34 is provided on the inner circumferential surface of the casing 34 to extend upright therefrom to secure the carrier side coupling member 38 of the posture control mechanism 15 thereto. The attachment piece 37 of the casing 34 is disposed at a position facing the attachment piece 35 on the internal circumferential surface of the casing 34. The z-directionally restrictive bearing 36 is restrictive means for suppressing deformation, such as deflection or the like, of the scale 12 resulting from the z-directionally biasing force of the posture control mechanism 15.

The posture control mechanism 15 includes the carrier side coupling member 38 secured to the carrier 14 and the slider side coupling member 24 secured to the slider 13.

The carrier side coupling member 38 is composed of a plate-like member 39 and folded pieces 40, 41. The plate-like member 39 is provided with an engaging hole 39a formed at a general center thereof to be engaged with the spherical protrusion 33 of the slider side coupling member 24. The folded pieces 40, 41 are formed by being generally vertically folded at both respective y-directional ends of the plate-like member 39. The engaging hole 39a of the plate-like member 39 is disposed to locate its center on the same straight line as the detection sensor 25 in a direction vertical to the scale 12, i.e., in the z-direction. The folded pieces 40, 41 of the plate-like member 39 are formed by folding the plate-like member 39 along corresponding folding lines parallel to the x-direction to thereby increase mechanical strength relative to the x-direction. This deals with the mechanical strength requested because the x-direction which is the traveling direction of the scale 12 is a direction where the displacement of the scale 12 is maximized and also such a load is maximized.

The carrier side coupling member 38 has property of a leaf spring as a whole and biases the slider 13 toward the scale 12, i.e., in the –z-direction.

The posture control mechanism 15 configured as described above biases the slider 13 in a direction vertical to the scale 12, i.e., in the –z-direction by the engagement of the spherical protrusion 33 attached to the slider 13 with the engaging hole 39a of the carrier side coupling member 38 as a leaf spring. In the posture control mechanism 15, the detection sensor 25, the spherical protrusion 33 and the plate-like member 39 are arranged to be aligned with each other in a direction where the carrier 14 and the slider 13 are vertical to the scale 12, i.e., in the –z-direction. Thus, the posture control mechanism 15 can efficiently exercise posture control on the detection sensor 25.

Incidentally, the posture control mechanism 15 is not limited to the configuration as described above. The posture control mechanism 15 may have any configuration as long as it is disposed to be aligned with the detection sensor 25 in the z-direction and the posture control of the slider 13 can be executed. Other embodiments of the posture control mechanism 15 are described with reference to FIGS. 8A, 8B and 8C.

Figure 8A:
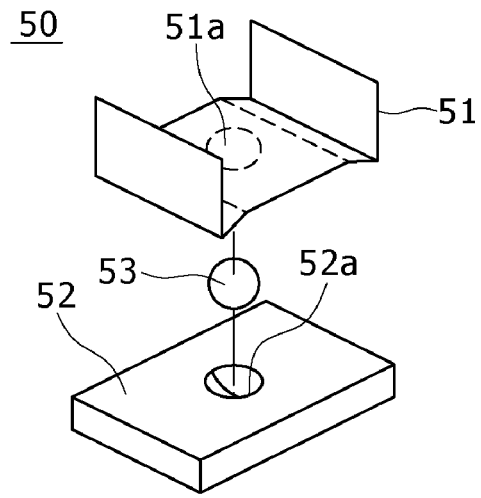
FIGS. 8A, 8B and 8C are schematic views of the posture control mechanism according to the respective other embodiments of the present invention.

Referring to FIG. 8A, a posture control mechanism 50 includes a plate-like member 51 secured to the carrier 14; a base portion 52 secured to the slider 13; and a spherical member 53 put between the plate-like member 51 and the best portion 52.

The plate-like member 51 has almost the same shape as that of the plate-like member 39 of the posture control mechanism 15; however, the plate-like member 51 is formed with a recessed portion 51a in place of the engaging hole 39a. The base portion 52 is provided with a spherical member 53 separate therefrom in place of the spherical protrusion 33 of the posture control mechanism 15 and formed with a recessed portion 52a adapted to receive the spherical member 53 engaged therewith. As with the posture control mechanism 15, the posture control mechanism 50 configured as above is provided to be aligned with the detection sensor 25 in the z-direction. Thus, the posture control mechanism 15 can exercise posture control with the entire mechanism maintained in a small size, and maintain constant the clearance between the detection sensor 25 and the recording medium 11, thereby executing position detection with a high degree of accuracy.

Figure 8B:
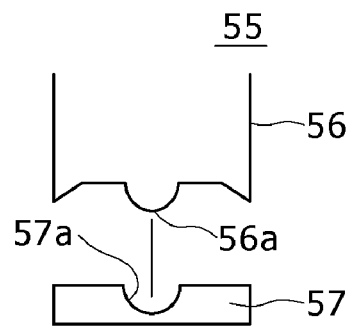

Referring to FIG. 8B, a posture control mechanism 55 includes a plate-like member 56 secured to the carrier 14 and formed with a spherical protrusion 56a; and a base portion 57 formed with an engaging hole 57a adapted to receive the spherical protrusion 56a engaged therewith.

As with the posture control mechanisms 15, 50, the posture control mechanism 55 configured as above is provided to be aligned with the detection sensor 25 in the z-direction. Thus, the posture control mechanism 55 can exercise posture control with the entire mechanism maintained in a small size, and maintain constant the clearance between the detection sensor 25 and the recording medium 11, thereby executing position detection with a high degree of accuracy.

Figure 8C:
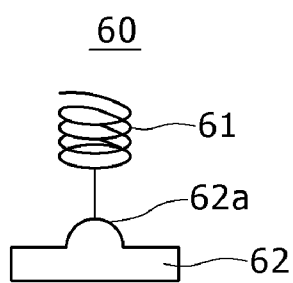
Figure 9:
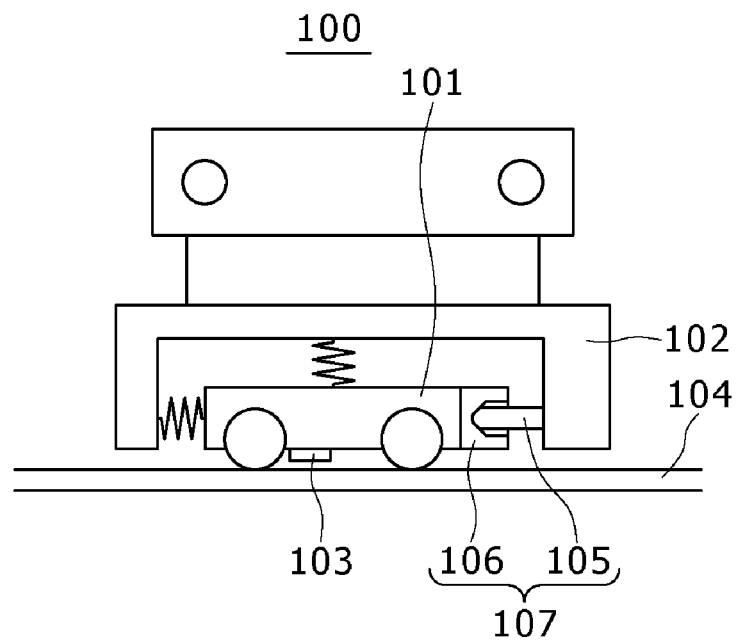
FIG. 9 is a schematic view of a traditional scale device.
Figure 10:
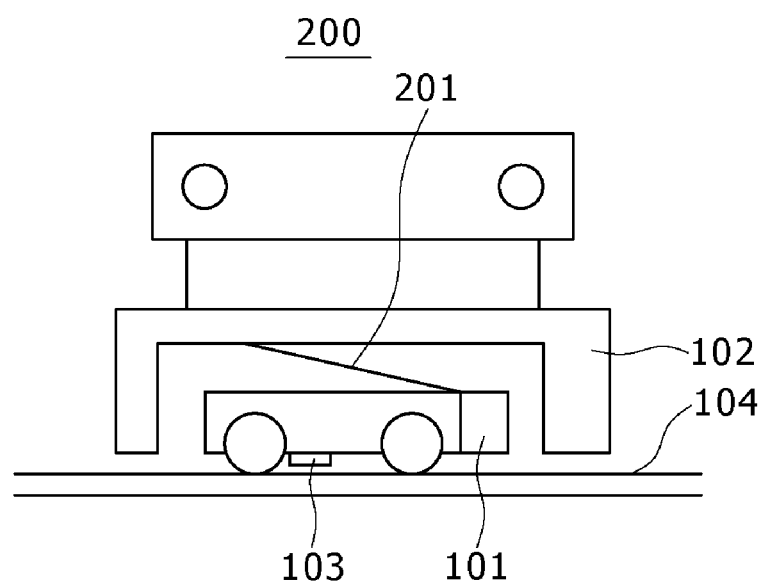
FIG. 10 is a schematic view of another traditional scale device.

Referring to FIG. 8C, a posture control mechanism 60 includes a coil spring 61 whose one end is secured to the carrier 14; and a base portion 62 formed with a spherical protrusion 62a engaged with the other end of the coil spring 61.

As with the posture control mechanisms 15, 50, 55, even the posture control mechanism 60 configured as above is provided to be aligned with the detection sensor 25 in the z-direction. Thus, the posture control mechanism 60 can exercise posture control with the entire mechanism maintained in a small size, and maintain constant the clearance between the detection sensor 25 and the recording medium 11, thereby executing position detection with a high degree of accuracy.

In the position detector 1 configured as above, since the posture control mechanism 15 connects the carrier 14 with the slider 13 and is located to be aligned with the detection sensor 25 in the z-direction, the biasing force of the carrier side coupling member 38 can efficiently be transmitted to the slider 13. This can maintain the posture of the slider 13 relative to the scale 12 in an optimum condition, that is, maintain the clearance between the detection sensor 25 and the recording medium 11 in a constant state. Thus, the position detector 1 can execute position detection with a high degree of accuracy.

In addition, the position detector 1 is provided with the bearings as guide restriction means for restricting the x-, y- and z-directional displacements. Therefore, the posture of the slider 13 relative to the scale 12 can be maintained in an optimum state, that is, maintain constant the clearance between the detection sensor 25 and the recording medium 11. In addition, an influence can be suppressed resulting from vibration or deflection of the scale 12 occurring at the time of a long stroke. Thus, the position detector 1 can maintain the position detection with a high degree of accuracy.

It is to be noted that obviously the present invention is not limited to only the embodiments described above and can be modified in various way in a range not departing from the gist of the invention.

What is claimed is:

1. A position detector comprising:

a scale provided with a recording medium recorded with information for position detection;

a slider disposed to face the recording medium of the scale and to relatively travel along an elongate direction of the scale and provided with a detection sensor for detecting the information of the recording medium;

a carrier for carrying the slider, and a posture control mechanism disposed between the carrier and the slider to control a posture of the slider relative to the scale, wherein the posture control mechanism is located on a straight line being vertical to a plane provided with the recording medium facing the detection sensor and passing the detection sensor and biases the slider toward the scale in the direction of the straight line for posture control, and the slider is provided with guide restricting means brought into slidable contact with the scale to restrict a biasing force of the posture control mechanism.

2. The position detector according to claim 1, wherein the posture control mechanism includes a carrier side coupling member secured to the carrier and composed of a plate-like member formed with an engaging hole at a general center thereof; and a slider side coupling member secured to the slider and formed with a spherical protrusion engaged with the engaging hole.

3. The position detector according to claim 2, wherein the carrier side coupling member is formed by folding both ends of the plate-like member along corresponding folding lines parallel to a longitudinal direction of the scale.

4. The position detector according to claim 1, wherein the carrier is further provided on a side opposite to the recording medium of the scale with restriction means for restricting deformation of the scale resulting from a biasing force applied to the scale of the posture control mechanism.

* * * * *